US008250893B2

(12) United States Patent
Richter et al.

(10) Patent No.: US 8,250,893 B2
(45) Date of Patent: Aug. 28, 2012

(54) ADJUSTABLE KNURLING TOOL

(75) Inventors: Frank Richter, Schwarzenbek (DE);
Wolfgang Hahn, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 506 days.

(21) Appl. No.: 12/408,227

(22) Filed: Mar. 20, 2009

(65) Prior Publication Data
US 2009/0235710 A1 Sep. 24, 2009

(30) Foreign Application Priority Data

Mar. 22, 2008 (DE) .......................... 10 2008 015 435

(51) Int. Cl.
*B21D 15/00* (2006.01)
(52) U.S. Cl. .............................. 72/108; 72/102; 72/103
(58) Field of Classification Search .................. 72/102, 72/104, 108, 120, 67, 100, 107, 110, 121, 72/103; 29/90.01
See application file for complete search history.

(56) References Cited

U.S. PATENT DOCUMENTS

| | | | | | |
|---|---|---|---|---|---|
| 3,191,416 | A | * | 6/1965 | Pritchett et al. | 72/106 |
| 4,169,637 | A | * | 10/1979 | Voitas | 384/278 |
| 4,761,877 | A | * | 8/1988 | Rupp | 483/54 |
| 4,785,649 | A | * | 11/1988 | Watanabe et al. | 72/104 |
| 5,427,466 | A | * | 6/1995 | Kennedy | 403/117 |
| 5,992,199 | A | * | 11/1999 | Giannetti | 72/108 |
| RE36,559 | E | * | 3/2000 | DeGuzman | 100/37 |
| 6,079,082 | A | * | 6/2000 | Riter et al. | 19/62 R |
| 6,190,241 | B1 | * | 2/2001 | Schriefer | 451/56 |
| 7,032,421 | B2 | * | 4/2006 | Mayr et al. | 72/108 |
| 7,377,922 | B2 | * | 5/2008 | Barker | 606/246 |
| 7,621,914 | B2 | * | 11/2009 | Ralph et al. | 606/71 |
| 7,785,691 | B2 | * | 8/2010 | Shepard et al. | 428/99 |
| 2003/0172758 | A1 | * | 9/2003 | Anderson | 74/410 |
| 2004/0099690 | A1 | * | 5/2004 | Elliott et al. | 222/166 |
| 2009/0072642 | A1 | * | 3/2009 | Miyamori et al. | 310/90 |
| 2009/0206220 | A1 | * | 8/2009 | Forrest et al. | 248/251 |

FOREIGN PATENT DOCUMENTS

DE 102 12 628 C1 10/2003
EP 1 445 048 A1 5/2003

* cited by examiner

*Primary Examiner* — Edward Tolan
*Assistant Examiner* — Homer Boyer
(74) *Attorney, Agent, or Firm* — Vidas, Arrett & Steinkraus, P.A.

(57) ABSTRACT

A knurling tool, with a base body featuring an axis and adapted to be clamped into a machine tool, which accommodates a holder and knurling wheels rotatably mounted in the holder, wherein knurling wheels arranged at equal circumferential distances are mounted in the holder around a wheel axis which embraces a first angle α1 with respect to the supporting axis, wherein a workpiece cone is insertable between the knurling wheels along the supporting axis and the knurling wheels embrace a second cone angle α2, wherein the holder features three segments, each of which mounting one knurling wheel via a bearing pin, an adjustment device is provided by which the segments, being guided radially, are radially adjustable synchronously about a certain amount, and fixing means are provided which fix the adjustment device and the segments, respectively, in an occupied position.

15 Claims, 3 Drawing Sheets

ADJUSTABLE KNURLING TOOL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Knurling tools have become known from EP 1 445 048 A1, the entire contents of which is incorporated herein by reference, or from DE 102 12 628 C2, the entire contents of which is incorporated herein by reference.

In the latter document, two knurling wheels are described, each of which is rotatably mounted on a knurling support element, wherein the same are adapted to be fixed on a base beam in a first radial wheel setting and in a second radial wheel setting as well. In this, the knurling tool is said to permit retooling from radial to axial knurling in a fast and simple manner. The distance of the knurling support elements from each other is adjustable.

In the execution according to EP 1 445 048 A1, the entire contents of which is incorporated herein by reference, at least one pivot pin is rotatably and adjustably mounted, on which a knurling wheel is freely rotatably mounted around an axis extending inclinedly relative to the axis of the pivot pin. The rotational position of the pivot pin can be fixed on the tool head by way of a fixing device.

Frequently there exists the objective to knurl a cone. A cone fixation for windscreen wiper bearings for automobile windscreen wiper apparatuses is standardised according to DIN 72783. For this purpose, it has become known, for instance from the manufacturer's document "Böni—Rändelwerkzeuge/Böni—Knurling tools", to mount two conical knurling wheels rotatably on a holder, the entire contents of which is incorporated herein by reference. From the manufacturer's document "Rollwalztechnik Abele+Höltig GmbH Rändelwerkzeuge" it is known to arrange a conical knurling wheel on an adjustable holder for every angle of knurling on a conical diameter, the entire contents of which is incorporated herein by reference. From the same document, a knurling thread roll head has also become known, on which three knurling wheels arranged at equal circumferential spacing are rotatably mounted on a cylindrical head.

The present invention is based on the objective to provide a knurling tool which is particularly suited for large scale production, with a high production speed and high service life at the same time. In addition, the possibility is to be provided to influence the toothing which is to be generated, and in particular, to use the tool for different workpiece diameters.

BRIEF SUMMARY OF THE INVENTION

In the knurling head according to the present invention, three knurling wheels arranged at equal circumferential distances are mounted around a wheel axis which embraces a first angle $\alpha 1$ with respect to the supporting axis. On their part, the knurling wheels have a second cone angle $\alpha 2$, wherein the difference of the angles $\alpha 1$, $\alpha 2$ corresponds to the cone angle of the workpiece which is to be knurled.

In the knurling tool of the present invention, three segments are provided further, from which each one bears a knurling wheel by way of a wheel axis. An adjustment device performs a synchronous radial adjustment of the segments about a certain amount, i.e. the segments bearing the knurling wheels are radially adjustable on their part. In addition, fixation means are provided, which fix the adjustment device and the segments, respectively, in an occupied radial position.

The knurling tool of the present invention is an axial knurling thread roll head with a three roll system. It may be used stationarily as well as rotatingly. It is distinguished by a very compact construction. It is particularly suited for a large scale production. The production speed is at least three times as high than with an one roll tool. With the cone knurling tool of the present invention, a significantly longer service life than with an one roll is tool obtained in addition.

A further significant advantage of the present invention is that by changing the position of the knurling wheels, the toothing which is to be generated can be influenced. Influencing the workpiece can be used for instance in order to avoid ridges which would be generated otherwise in the transition between the conical toothing and a cylinder. Besides to this, the knurling thread roll head of the present invention can be used for different workpiece diameters.

According to one embodiment of the present invention, the segments are radially guided with respect to the base body.

According to a further embodiment of the present invention, the segments are arranged between a plate of the base body and an adjustment disc, wherein the adjustment disc is in connection with the segments via cylindrical studs, and the studs are guided in bow-shaped grooves of the adjustment disc. In this way, the bow-shaped grooves which have a continuously changing radius determine the radial position of the segments, and with this that of the knurling wheels.

In order to perform an adjustment of the segments, a further embodiment of the present invention provides that a guiding plate is arranged between the segments and the adjustment disc, which is fixedly connected with the plate via a screw connection, the guiding plate being arranged between the segments and the adjustment disc. The tension between the guiding plate and the plate of the base body provides for a fixation of the segments in the radial direction. Only when the same is released, a radial adjustment of the segments can take place with the aid of the adjustment disc. In this, the cylindrical studs must be received matchingly and rotatingly by the grooves.

According to another embodiment of the present invention, the segments feature seating openings for the knurling wheels, the seating openings being arranged transversely to the bore in which the bearing pins for the knurling wheels are arranged. Transversal bores in the segments accommodate set screws in order to fix the bearing pins in the rotational direction and axially. According to a further embodiment of the present invention, the bearing pins feature thrust bearings on the side facing the clamping side, and also a bushing on which the knurling wheels run along.

The plate of the base body can be provided with a coupling portion in order to be connected to a clamping shaft.

BRIEF DESCRIPTION OF EACH OF THE DRAWINGS

An example of the execution of the present invention is explained in more detail in the following by means of drawings.

DETAILED DESCRIPTION OF THE INVENTION

Figure 1:
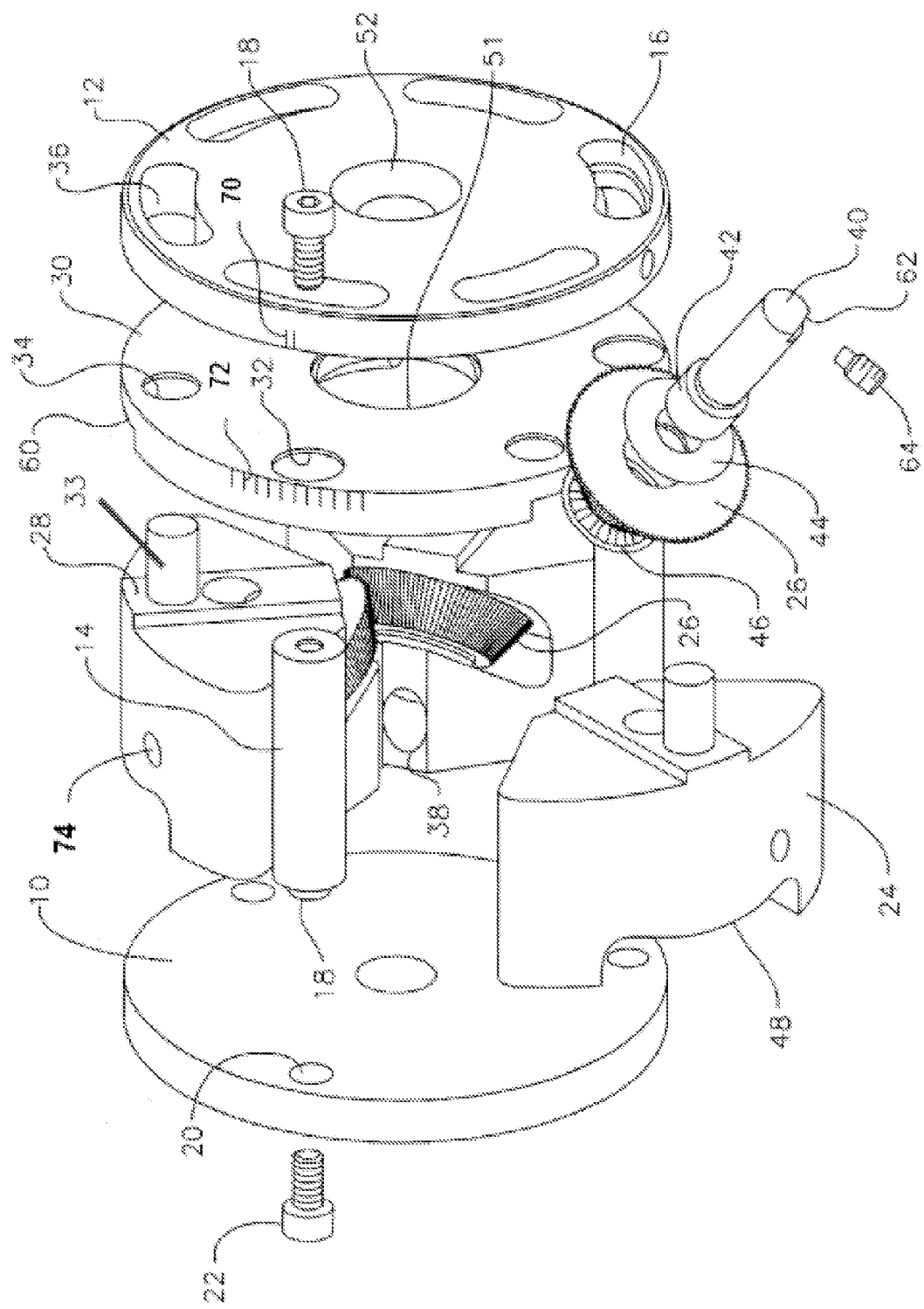
FIG. 1 shows a knurling tool of the present invention in an exploded perspective view.

While this invention may be embodied in many different forms, there are described in detail herein a specific preferred embodiment of the invention. This description is an exemplification of the principles of the invention and is not intended to limit the invention to the particular embodiment illustrated In FIG. 1 to 4, a base body for a knurling tool has a plate 10 and an adjustment disc 12, which are kept in a distance by distance pins 14, so that the plate 10 and the adjustment 12 disc are arranged in parallel. The latter features first bow-shaped slits 16, which accommodate fastening screws 18 which are screwed into that end of the distance pins 14 which is the right one in FIG. 1. The head of the screws 18 bears against the adjustment disc from the outside. The left end of the distance pins 14 has a finger 18 reduced in diameter, which is accommodated in a corresponding through bore 20 of the plate 10. A fastening screw 22 is screwed into the finger 18.

Three segments 24 arranged at equal circumferential distances each accommodate one conical knurling wheel 26. On the right side, they have a rib shaped, radially running projection 28 and a stud 33 formed on in this region. Between the segments 24 and the adjustment disc 12, a guiding plate 30 is arranged with first through bores 32, through which the distance pins 14 extend matchingly. The studs 33 engage into radial long holes 34. In the assembled condition, they extend into two bow-shaped slits 36 of the adjustment disc 12. The diameter of the studs 33 corresponds to the width of the slits 36.

Figure 3:
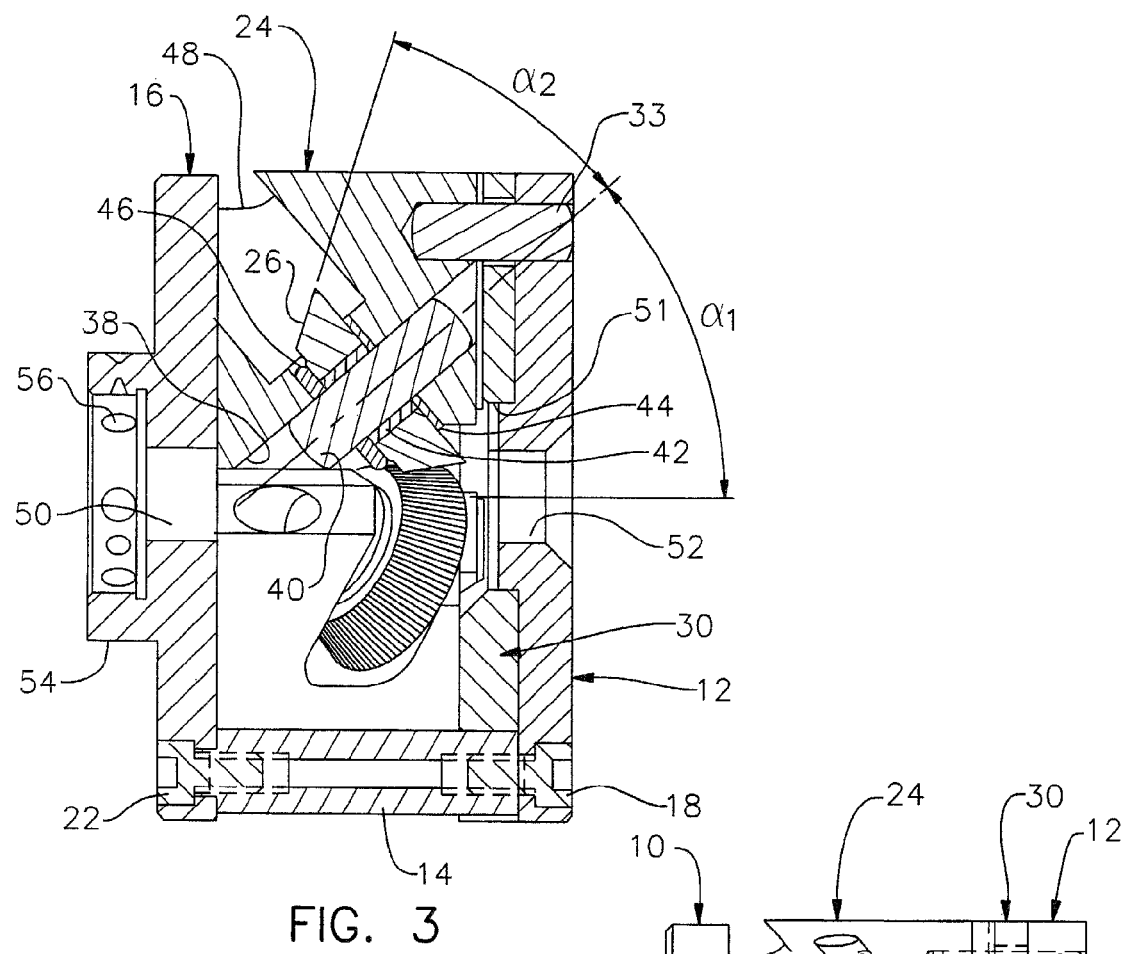
FIG. 3 shows a section through the depiction after FIG. 2 along the line 3-3.
Figure 4:
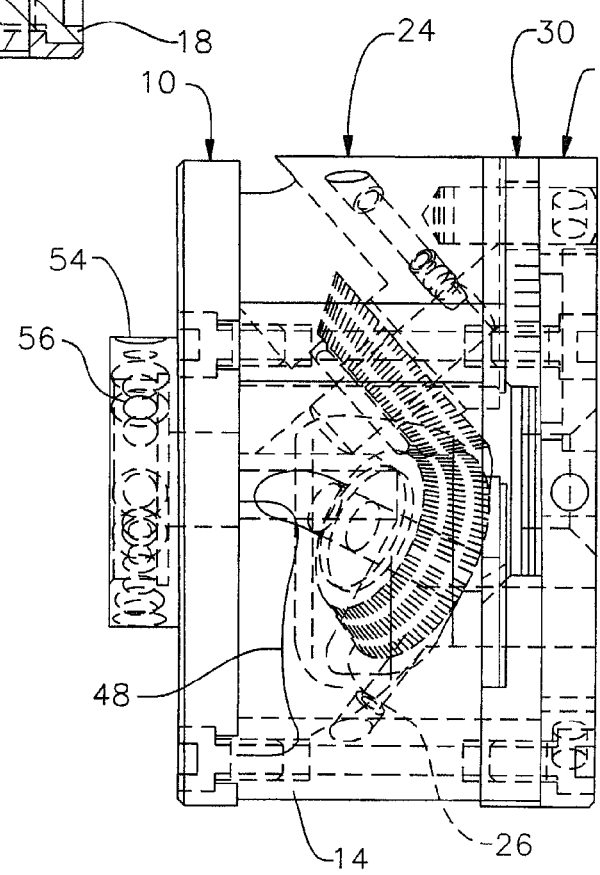
FIG. 4 shows a lateral view of the knurling tool after FIG. 2.

The assembly of the tool after FIG. 1 can be recognised more clearly in FIGS. 3 and 4. Each segment 24 has a through bore 38, which extends obliquely to the axis of the assembled plates 10, 30. The through bores accommodate a bearing pin 40 for the bearing of one knurling wheel 26. This bearing can be recognised better in FIG. 1. A bushing 42 for the knurling wheel 26 sits on the bearing pin 40, wherein an axial disc 44 is arranged between a corresponding accommodation of the segment 24 for the knurling wheel 26 and the knurling wheel. On the other side of the knurling wheel 26 sits a thrust bearing 46. The knurling wheel 26 is inserted by way of a recess 44 48, open towards the outside, in the segment 24.

The plates 10, 30 and 12 have central openings 50, 51 and 52, respectively, for a conical workpiece (not shown), which is to be knurled by the knurling wheels 26.

A coupling portion 54 is formed on the plate 10 in the form of an annular cylindrical collar, into which counter bored radial holes 56 are formed. A not shown clamping shank with a radial flange is matchingly set into the annular cylindrical collar 54. It has radial threaded bores which can be aligned to the holes 56. For the fixation of these parts, not shown screws are used. The countersinks are slightly eccentric, so that the radial flange is clamped against the front side of the radial collar 54. The radial collar and the not shown coupling portion can feature indexing means in order to couple them in a preset relative rotational position.

Figure 2:
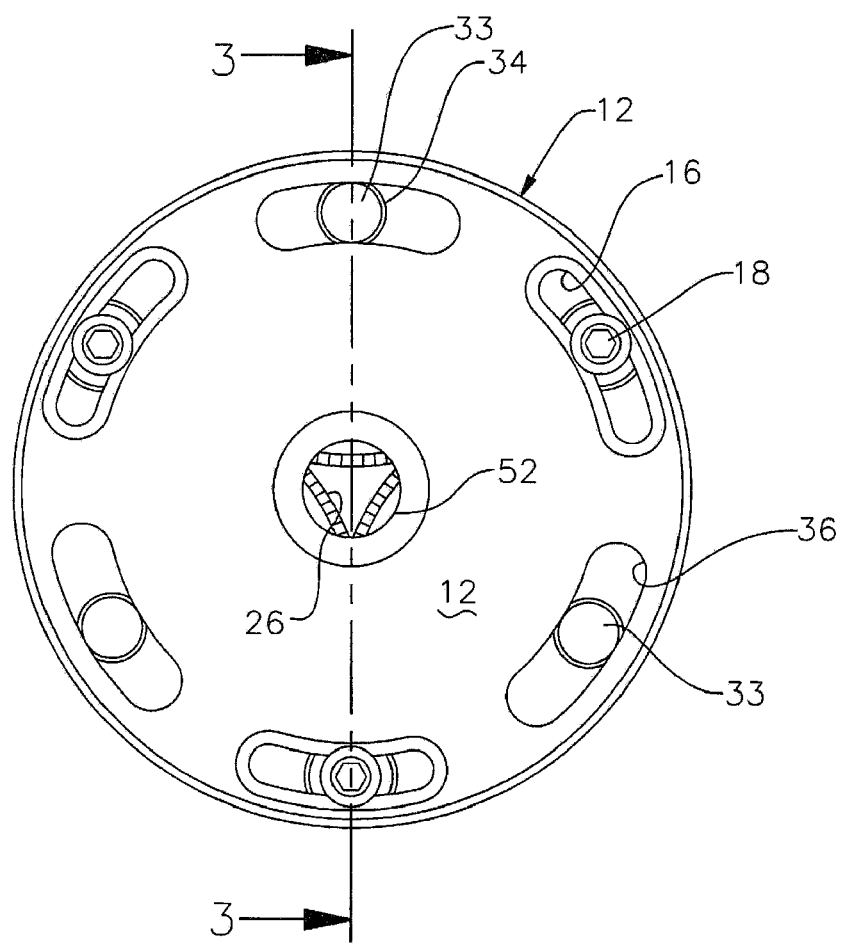
FIG. 2 shows a front view of the knurling tool after FIG. 1 in the assembled condition.

As can be deduced from FIG. 2, the studs 33 and the fastening screws 18 are each at a time located in the centre of the associated bow-shaped slits 16 in this. When the fastening screws 18 are released, the adjustment disc 12 can be rotated and in this it takes the segments 24 synchronously along, wherein the studs 33 migrate along the slits 36 and the long holes 34 and are somewhat shifted in their radial position, because the slits 36 lie in a helical line and therefore have different radial distances to the axis of the knurling head. In this way, a shift of the segments 24 takes place also, wherein the tongues 28 and corresponding grooves 60 on the facing side of the guiding plate 30 provide for a linear guiding in the radial direction. With the aid of this construction, it is therefore possible to change the distance of the knurling wheels from each other in certain limits.

As can be further recognised in FIG. 2, the bearing pins 40 have flattenings 62 on the right end, with which fastening screws 64 co-operate. The fastening screws are inserted into threaded bores 74 of the segments 24 extending transversely to the bore 38, in order to fix the bearing pins 40 in their axial position. At the same time, the pins are prevented from a rotation through this.

A marker 70 on the adjustment disc 12 co-operates with a scale 72 of the guiding disc 30 in order to indicate the shift position.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A knurling tool, with a base body featuring an axis and adapted to be clamped into a machine tool, which accommodates a holder and conical knurling wheels rotatably mounted in the holder, wherein three conical knurling wheels arranged at equal circumferential distances are mounted in the holder around a wheel axis which embraces a first angle $\alpha 1$ with respect to the supporting axis, wherein a workpiece cone is insertable between the conical knurling wheels along the supporting axis and the conical knurling wheels embrace a second cone angle $\alpha 2$, characterised in that the holder features three segments, each of which mounting one conical knurling wheel via a bearing pin, an adjustment device is provided by which the segments, being guided radially, are radially adjustable synchronously about a certain amount, and fixing means are provided which fix the adjustment device and the segments, respectively, in an occupied position.

2. A knurling tool according to claim 1, characterised in that the segments are radially guided in the base body.

3. A knurling tool according to claim 2, characterised in that the segments are arranged between a plate of the base body and an adjustment disc, the adjustment disc is in connection with the segments via cylindrical studs and the studs are guided in bow-shaped slits of the adjustment disc, which are arranged on a screw-like or helical line.

4. A knurling tool according to claim 3, characterised in that a guiding plate is arranged between the segments and the adjustment disc and is fixedly connected with the base body, the studs being guided through radial long holes of the guiding plate.

5. A knurling tool according to claim 3, characterised in that spacer pins are arranged between the plate and the guiding plate, which are screwed together with the plate and the guiding plate, and that the screw connection in the region of the adjustment disc is within slits of the adjustment disc.

6. A knurling tool according to claim 3, characterised in that a radial guiding by tongue and groove is provided between the segments and the guiding plate.

7. A knurling tool according to claim 1, characterised in that the segments feature seating openings for the conical knurling wheels open towards the circumference, wherein bearing pins for the conical knurling wheels sit in bores of the segments.

8. A knurling tool according to claim 7, characterised in that the segments feature transversal threaded bores for the accommodation of set screws.

9. A knurling tool according to claim 8, characterised in that an thrust bearing is arranged on the bearing pins on the side of the conical knurling wheels facing the clamping side.

10. A knurling tool according to claim 7, characterised in that the conical knurling wheels sit on the bearing pins via a bushing.

11. A knurling tool according to claim 8, characterised in that the base body features a coupling portion and the clamping shaft features a complementary second coupling portion.

12. A knurling tool according to claim 11, characterised in that the base body and the clamping shaft feature means for coupling the same in a preset relative rotational position.

13. A knurling tool according to claim 11, characterised in that the clamping shaft features a cylindrical collar, which is matchingly insertable into a coaxial cylindrical recess of the first coupling portion, wherein a radial ring surface at the rear side of the coupling portion bears against a radial abutment face of the second coupling portion, and the first coupling portion features radial bores spaced apart in the circumferential direction which accommodate fixation screws, and the axial collar features threaded holes for the accommodation of the threaded shank of the fixation screws.

14. A knurling tool according to claim 13, characterised in that the radial bores and the fixation screws are executed such that the radial ring surface and the radial abutment face of the first coupling portion are tensioned against each other when the fixation screws are screwed in.

15. A knurling tool according to claim 9, characterised in that the radial bores feature an eccentric conical countersink.

* * * * *